United States Patent
Tsutsumi et al.

(10) Patent No.: US 10,971,305 B2
(45) Date of Patent: Apr. 6, 2021

(54) METHOD FOR MANUFACTURING CERAMIC ELECTRONIC COMPONENT AND CERAMIC ELECTRONIC COMPONENT

(71) Applicant: Murata Manufacturing Co., Ltd., Kyoto-fu (JP)

(72) Inventors: Masaki Tsutsumi, Nagaokakyo (JP); Tatsuo Kunishi, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 39 days.

(21) Appl. No.: 16/666,177

(22) Filed: Oct. 28, 2019

(65) Prior Publication Data

US 2020/0066449 A1    Feb. 27, 2020

Related U.S. Application Data

(63) Continuation of application No. PCT/JP2018/003751, filed on Feb. 5, 2018.

(30) Foreign Application Priority Data

May 31, 2017   (JP) .............................. JP2017-107346

(51) Int. Cl.
*H01G 4/232* (2006.01)
*C25D 5/54* (2006.01)
(Continued)

(52) U.S. Cl.
CPC ............... *H01G 4/232* (2013.01); *C25D 5/54* (2013.01); *H01G 4/1227* (2013.01); *H01G 4/30* (2013.01)

(58) Field of Classification Search
CPC ......... H01G 4/232; H01G 4/30; H01G 4/2325
(Continued)

(56) References Cited

U.S. PATENT DOCUMENTS

2013/0161613 A1\* 6/2013 Nakamura ........ H01L 31/02963
257/43
2016/0372255 A1\* 12/2016 Maki ...................... H01F 27/24

FOREIGN PATENT DOCUMENTS

JP    S64-033084 A    2/1989
JP    2004-40084 A    2/2004
(Continued)

OTHER PUBLICATIONS

International Search Report issued in PCT/JP2018/003751; dated Apr. 24, 2018.
(Continued)

*Primary Examiner* — Sherman Ng
(74) *Attorney, Agent, or Firm* — Studebaker & Brackett PC

(57) ABSTRACT

A method for manufacturing a ceramic electronic component in which a plated electrode can be formed in a region of the surface of a ceramic base body formed of a titanium-containing metal oxide. The method includes preparing a ceramic base body containing a titanium-containing metal oxide, forming a low-resistance section by modifying the metal oxide through irradiation of part of a surface layer portion of the ceramic base body with a pulse laser with a peak power density of $1\times10^6$ W/cm$^2$ to $1\times10^9$ W/cm$^2$ and a frequency of 500 kHz or less, and forming an electrode on the low-resistance section by electroplating. The laser irradiation generates an O defect in a titanium-containing metal oxide, such as $BaTiO_3$ to form an n-type semiconductor. Since this semiconductor section has a lower resistance value than the metal oxide, plating metal can be selectively deposited by electroplating.

20 Claims, 2 Drawing Sheets

(51) Int. Cl.
 *H01G 4/12* (2006.01)
 *H01G 4/30* (2006.01)
(58) Field of Classification Search
 USPC ..................................................... 361/301.4
 See application file for complete search history.

(56) References Cited

FOREIGN PATENT DOCUMENTS

| | | |
|---|---|---|
| JP | 2014-065649 A | 4/2014 |
| JP | 2016-004885 A | 1/2016 |
| JP | 2017-11256 A | 1/2017 |

OTHER PUBLICATIONS

Written Opinion issued in PCT/JP2018/003751; dated Apr. 24, 2018.

* cited by examiner

FIG. 1
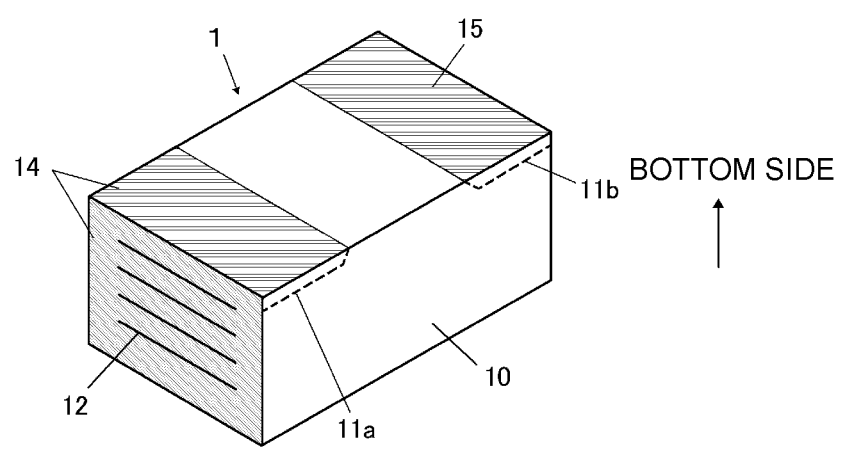
FIG. 2
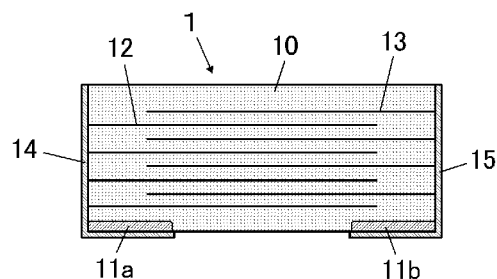
PULSE LASER
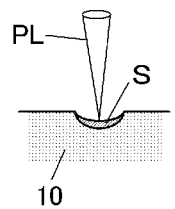
FIG. 3A
CONTINUOUS WAVE LASER
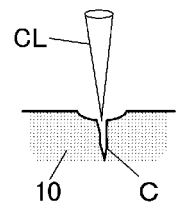
FIG. 3B

METHOD FOR MANUFACTURING CERAMIC ELECTRONIC COMPONENT AND CERAMIC ELECTRONIC COMPONENT

CROSS-REFERENCE TO RELATED APPLICATIONS

This application claims benefit of priority to International Patent Application No. PCT/JP2018/003751, filed Feb. 5, 2018, and to Japanese Patent Application No. 2017-107346, filed May 31, 2017, the entire contents of each are incorporated herein by reference.

BACKGROUND

Technical Field

The present disclosure relates to a method for manufacturing a ceramic electronic component and, more particularly, to a method for forming a plated electrode on the surface of a ceramic base body, and a ceramic electronic component.

Background Art

In the related art, a method for forming an outer electrode of an electronic component typically involves applying an electrode paste onto each end surface of a ceramic base body; next baking or thermally curing the electrode paste to form an underlying electrode; and forming a plated electrode on the underlying electrode by plating.

The electrode paste is applied by immersing the end portion of an electronic component in a paste film formed so as to have a predetermined thickness or by using transfer with a roller or the like. These techniques have a problem in that the thickness of the electrode is increased by application of the electrode paste, and the external dimensions of the electronic component are increased accordingly.

Instead of such an electrode formation method using the electrode paste, there is proposed a method for forming an outer electrode in Japanese Unexamined Patent Application Publication No. 2004-40084. The method includes exposing plural end portions of inner electrodes on the end surfaces of a ceramic base body, the end portions being adjacent to each other; exposing dummy terminals called anchor tabs on the same end surfaces as those on which the end portions of the inner electrodes are exposed, the dummy terminals being adjacent to the end portions of the inner electrodes; and performing electroless plating on the ceramic base body to grow a plating metal from the end portions of the inner electrodes and the anchor tabs, which serve as nuclei for plating metal growth. This method enables formation of outer electrodes only through plating.

In this method, however, it is necessary to expose the end portions of the inner electrodes and the anchor tabs on the end surfaces of the ceramic base body, the end portions of the inner electrodes being adjacent to the anchor tabs, wherein the end portions of the inner electrodes and the anchor tabs serve as nuclei for plating deposition. This method thus has disadvantages of complicated manufacturing processes and high costs. In addition, since outer electrodes can be formed only on the surfaces on which the end portions of the inner electrodes are exposed, this method has a problem in that the regions where the outer electrodes are formed are limited.

The inventors of the present disclosure propose an electrode forming method including forming a low-resistance section by irradiating the surface of a sintered ceramic containing a metal oxide (especially ferrite) with a laser to reduce part of the metal oxide and forming a plated electrode on the low-resistance section as described in Japanese Unexamined Patent Application Publication No. 2017-11256. By using this method, a plated electrode can be formed in a given region of the surface of an electronic component.

Japanese Unexamined Patent Application Publication No. 2017-11256 mainly focuses on formation of the low-resistance section by reducing Fe oxide in ferrite, which is a main target as a metal oxide, through laser irradiation. There is a need for a suitable method for forming a low-resistance section, on which plating can be deposited, through laser irradiation on a titanium-containing metal oxide, such as $BaTiO_3$, used in multilayer ceramic capacitors and the like.

SUMMARY

Accordingly, the present disclosure provides a method for manufacturing a ceramic electronic component in which a plated electrode can be formed in a given region of the surface of a ceramic base body formed of a titanium-containing metal oxide and to provide a ceramic electronic component.

In a first aspect of the present disclosure, a method for manufacturing a ceramic electronic component includes a step of preparing a ceramic base body containing a titanium-containing metal oxide; a step of forming a low-resistance section by modifying the metal oxide through irradiation of part of a surface layer portion of the ceramic base body with a pulse laser; and a step of forming an electrode on the low-resistance section by electroplating, wherein the irradiation with the pulse laser is performed with a peak power density of $1\times10^6$ W/cm$^2$ to $1\times10^9$ W/cm$^2$ and a frequency of 500 kHz or less.

In a second aspect of the present disclosure, a ceramic electronic component includes a ceramic base body containing a titanium-containing metal oxide; a low-resistance section formed in part of a surface layer portion of the ceramic base body and obtained by modifying the metal oxide; and an electrode formed on the low-resistance section and made of a plating metal, wherein the metal oxide is formed into an n-type semiconductor in the low-resistance section.

The present disclosure is based on the following findings. When the surface layer portion of a ceramic base body containing a titanium-containing metal oxide (hereinafter referred to as a titanium-based metal oxide) is irradiated with a laser, a low-resistance section for forming a plated metal cannot be formed, or a crack may be generated. The reason for this may be because a titanium-based metal oxide, such as $BaTiO_3$, is not reduced by only low-power laser irradiation due to high bonding strength between metal ions and oxide ions, which makes it difficult to achieve resistance reduction. However, the use of high-power laser causes abrasion of the metal oxide or generates a crack, which leads to a problem of deterioration in characteristics suitable for products. In the present disclosure, a low-resistance section on which a plated electrode can be deposited can be formed by using a pulse laser as a laser and focusing attention on two parameters: peak power density and frequency.

The mechanism for forming a low-resistance section is assumed as described below. Specifically, the heating of a titanium-based metal oxide, such as $BaTiO_3$, with laser irradiation generates an O defect to form an n-type semiconductor in which an excess electron flows in the conduction band of the titanium-based metal oxide. A pulse laser can concentrate its energy in a short time period to provide a high peak power. Only a portion of the metal oxide near the surface is repeatedly heated and cooled at pulse-pulse time intervals, so that heat is not distributed excessively. This enables resistance reduction (semiconductor formation) without generation of cracks and abrasion.

There are suitable conditions (parameters such as peak power density and frequency) for pulse-laser irradiation. Specifically, good results are obtained when the pulse-laser irradiation is performed under the conditions of a peak power density of $1\times10^6$ W/cm$^2$ to $1\times10^9$ W/cm$^2$ and a frequency of 500 kHz or less. If pulse-laser irradiation is performed with a peak power density lower than the foregoing peak power density, the titanium-based metal oxide is not formed into a semiconductor at all, or it takes time to reach the temperature at which an O defect is generated, so that the metal oxide may be relatively deeply heated from its surface through thermal diffusion. In this case, a wide area is thermally affected, and volume expansion may result in crack generation. Crack generation increases the resistance value to inhibit plating even when a low-resistance section is formed. However, if pulse-laser irradiation is performed with a peak power density higher than the foregoing peak power density, the temperature of an area near the surface increases in a short time to a temperature above the temperature range in which an O defect is generated. This may generate cracks or may cause the metal oxide to evaporate and diffuse out, that is, cause abrasion. Therefore, the titanium-based metal oxide can be formed into a semiconductor by appropriate control of the peak power density of a pulse laser while generation of cracks and abrasion is suppressed.

The pulse-pulse time interval changes when the frequency of a pulse laser changes. If the frequency is too high (the pulse-pulse time interval is too short) even at a suitable peak power density, the once heated surface is irradiated with next pulse before sufficiently cooled, and a crack may be generated due to heat accumulation. If the frequency is too low, there may be no particular problem in resistance reduction, but the laser irradiation time increases, which makes it substantially difficult to use a low-frequency pulse laser in industrial fields.

When the pulse-laser irradiation conditions are a peak power density of $1\times10^6$ W/cm$^2$ to $1\times10^8$ W/cm$^2$ and a frequency of 10 kHz to 100 kHz, generation of fine cracks is suppressed, and a low-resistance section with good plating deposition properties can be formed. As a pulse laser, a known laser, such as YVO$_4$ laser or an YAG laser, can be used.

The titanium-based metal oxide on which a low-resistance section can be formed by pulse-laser irradiation is, for example, BaTiO$_3$ which is used for multilayer ceramic capacitors. A low-resistance section can be formed by performing pulse-laser irradiation on other titanium-based metal oxides, such as SrTiO$_3$, TiO$_2$, PbTiO$_3$, PZT, PLZT, K$_2$Ti$_6$O$_{13}$, and Ba$_2$Ti$_9$O$_{20}$, in addition to BaTiO$_3$.

The present disclosure can be applied to formation of outer electrodes in multilayer ceramic capacitors. A multilayer ceramic capacitor may have the following structure: plural end portions of inner electrodes are exposed on each of both end surfaces of the ceramic electronic component; the low-resistance section is formed in at least one side surface adjacent to the both end surfaces of the ceramic electronic component in such a manner that the low-resistance section is formed in each of portions of the side surface that adjoin the respective end surfaces; and the electrode made of a plating metal is continuously formed on each end surface and each low-resistance section of the ceramic electronic component. Specifically, when the low-resistance section is formed in the side surface adjacent to the both end surfaces on which the end portions of the inner electrodes are exposed, in such a manner that the low-resistance section is formed in each of portions of the side surface that adjoin the respective end surfaces, the plated electrode can be continuously formed on each end surface and each low-resistance section of the ceramic electronic component by electroplating of the ceramic capacitor in a plating bath. Since the end portions of the inner electrodes are exposed on each end surface, the plated electrode can be formed without special resistance reduction. In other words, there is no need to form a separate electrode between each end surface and each low-resistance section, and the outer electrode can be formed by one plating process. As needed, a low-resistance section may also be formed in a part or the entirety of each end surface on which the end portions of the inner electrodes are exposed.

The "low-resistance section" in the present disclosure refers to a section (a type of semiconductor) with a lower resistance value than a section (oxide) that is not irradiated with a pulse laser. The low-resistance section does not necessarily have a continuous plane shape, and may have plural independent parts. Since the low-resistance section has a lower resistance value than other surface portion as described above, the plating metal is easily deposited, and the deposited metal grows so as to serve as a nucleus for metal growth, which makes it easy to form a continuous electrode. Since the low-resistance section can be formed in a given region that can be irradiated with a pulse laser, a plated electrode can also be formed in a given region of the electronic component. In addition, many components can be treated simultaneously in one plating process, which results in high efficiency and low industrial costs.

The "electrode made of a plating metal" in the present disclosure is not limited to an outer electrode and may be any electrode. The "electrode made of a plating metal" may be, for example, a pad electrode, a land electrode, a coiled electrode, or a circuit pattern electrode. Moreover, the ceramic electronic component is not limited to a chip component and may be a composite component such as a circuit module, or a circuit substrate or a multilayer substrate.

According to the present disclosure, as described above, the surface layer portion of a ceramic base body formed of a titanium-based metal oxide is irradiated with a pulse laser that satisfies two suitable parameters: peak power density and frequency. Through irradiation with the pulse laser, the titanium-based metal oxide is formed into a semiconductor to form a low-resistance section. By forming an electrode on the low-resistance section by electroplating, the electrode can be formed in a given area of the surface of the electronic component. In particular, a titanium-based metal oxide is difficult to reduce, and cracks or abrasion tends to be generated in the titanium-based metal oxide. However, the use of a pulse laser with predetermined conditions enables formation of a low-resistance section on which a plated electrode is to be deposited.

BRIEF DESCRIPTION OF THE DRAWINGS

FIG. 1 is a perspective view of a multilayer ceramic capacitor in a first embodiment of a ceramic electronic component according to the present disclosure;

FIG. 2 is a cross-sectional view of the multilayer ceramic capacitor illustrated in FIG. 1;

FIG. 3A illustrates a schematic view of the irradiation of a titanium-based metal oxide with a pulse laser, and FIG. 3B illustrates a schematic view of the irradiation of a titanium-based metal oxide with a continuous wave laser.

DETAILED DESCRIPTION

Figure 4:
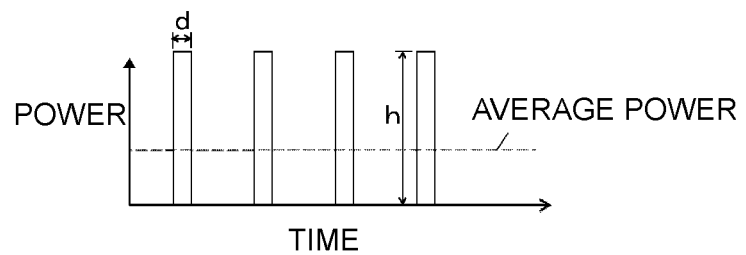
FIG. 4 is a figure illustrating changes in power of the pulse laser.

FIG. 1 and FIG. 2 illustrate a multilayer ceramic capacitor 1 in a first embodiment of a ceramic electronic component according to the present disclosure. In FIG. 1, the bottom surface of the capacitor 1 faces upward. The capacitor 1 includes a ceramic base body 10 having a substantially rectangular parallelepiped shape; inner electrodes 12 and 13 formed inside the ceramic base body 10 and alternately exposed on the respective end surfaces; and outer electrodes 14 and 15 continuously formed on the respective end surfaces and the bottom surface. All the drawings including FIG. 1 illustrate schematic views, and the sizes, the aspect ratios, and the like may not be drawn to scale.

The ceramic base body 10 is made of, for example, a sintered ceramic material containing a titanium-based metal oxide, such as $BaTiO_3$. As illustrated in FIG. 2, low-resistance sections 11a and 11b are formed in both end portions of the bottom surface of the ceramic base body 10, that is, in portions that adjoin the both end surfaces on the bottom surface side. The low-resistance sections 11a and 11b are formed of an n-type-semiconductor obtained by modifying the titanium-based metal oxide through irradiation with a pulse laser described below.

For example, in the case of $BaTiO_3$, the following reaction may occur through irradiation with a pulse laser.

$$BaTiO_3 + \text{pulse laser} \rightarrow BaTiO_x + O_2\uparrow$$

$BaTiO_x$ is a type of semiconductor, and x is larger than 2 and smaller than 3.

Since the low-resistance sections 11a and 11b have a lower resistance value than other sections (metal oxide), a plating metal can be deposited on the low-resistance sections 11a and 11b by electroplating. The outer electrodes 14 and 15 formed of the plating metal are continuously formed on the respective end surfaces and the respective low-resistance sections 11a and 11b of the ceramic base body 10. Since the end portions of the inner electrodes 12 and 13 are exposed on the respective end surfaces of the ceramic base body 10, the plating metal can be deposited without special resistance reduction. It should be understood that a low-resistance section may be formed in each end surface as needed.

The outer electrodes 14 and 15 have an L-shape in front view in this embodiment. The outer electrodes 14 and 15 may have a U-shape when the low-resistance sections 11a and 11b are further formed on the top surface side. In addition, by selecting a pulse-laser irradiation range, low-resistance sections can be formed in given regions, and outer electrodes can further be formed in given regions. The outer electrodes 14 and 15 are formed of a single plating layer in FIG. 2, but may be formed of plural plating layers. For example, an underlying plating layer may be formed on each of the low-resistance sections 11a and 11b, and a plating layer made of a different metal may be formed on the underlying plating layer in order to improve corrosion resistance and wettability. The plating layers that constitute the outer electrodes 14 and 15 may be made of a given material and may have a given number of layers.

FIGS. 3A and 3B illustrate examples of laser radiation for forming low-resistance sections on a surface layer portion of the ceramic base body 10 formed of a titanium-based metal oxide. FIG. 3A illustrates the cross section of the surface layer portion irradiated with a pulse laser PL. FIG. 3B illustrates the cross section of the surface layer portion irradiated with a continuous wave laser CL. A continuous wave laser with low power fails to reduce resistance, whereas a continuous wave laser with high power tends to generate a crack C. FIG. 3B illustrates generation of a crack C. A pulse laser can form a low-resistance section S without generating a crack when the peak power density and the frequency are appropriately selected.

As illustrated in FIG. 4, a pulse laser can concentrate its energy in a short time period to provide a high peak power. In FIG. 4, d is a pulse width, the height h is a peak power, and the area (d×h) is a peak energy. The broken line indicates an average power. The peak energy is divided by the laser spot area to produce a pulse power density, that is, peak energy density. The average power density and peak power density of a pulse laser have the following relationship.

Average power density($W/cm^2$)=peak power density ($W/cm^2$)×pulse width($s$)×frequency($Hz$)

Example 1

Next, the pulse-laser irradiation experiment was carried out at various peak power densities and various frequencies by using a $BaTiO_3$-based ceramic single plate as a substrate. A $YVO_4$ fiber laser was used as a pulse laser, the laser scanning condition was 100 mm/s, and the pitch interval was 30 μm. The laser-irradiation range was a 5 mm×5 mm square region. The reduction in resistance was determined by measuring the resistance in the laser-irradiated area. The results are shown in Table 1. The O marks in the results indicate that the low-resistance section was formed.

TABLE 1

| Peak Power Density ($W/cm^2$) | Frequency (kHz) | Wavelength (nm) | Results |
|---|---|---|---|
| $2.0 \times 10^{11}$ | 100 | 355 | abrasion |
| $8.8 \times 10^{10}$ | 100 | 532 | abrasion |
| $1.4 \times 10^{10}$ | 600 | 1064 | abrasion |
| $1.4 \times 10^{10}$ | 100 | 1064 | crack |
| $7.0 \times 10^{9}$ | 600 | 1064 | abrasion |
| $7.0 \times 10^{9}$ | 100 | 1064 | crack |
| $1.0 \times 10^{9}$ | 100 | 1046 | ○ |
| $7.8 \times 10^{8}$ | 600 | 532 | crack |
| $7.8 \times 10^{8}$ | 500 | 532 | ○ |
| $7.8 \times 10^{8}$ | 5 | 1064 | ○ |
| $2.8 \times 10^{8}$ | 100 | 532 | ○ |
| $2.5 \times 10^{8}$ | 40 | 532 | ○ |
| $1.3 \times 10^{8}$ | 1 | 248 | ○ |
| $7.1 \times 10^{7}$ | 20 | 1064 | ○ |
| $5.2 \times 10^{7}$ | 100 | 1064 | ○ |
| $5.0 \times 10^{7}$ | 200 | 1064 | ○ |
| $4.2 \times 10^{6}$ | 200 | 1064 | ○ |
| $3.8 \times 10^{6}$ | 20 | 1064 | ○ |
| $1.0 \times 10^{6}$ | 20 | 1064 | ○ |
| $4.2 \times 10^{5}$ | 20 | 1064 | no resistance reduction |
| $4.2 \times 10^{5}$ | 4.5 | 1064 | crack |
| $7.0 \times 10^{5}$ | 1.5 | 1064 | crack |
| $4.2 \times 10^{5}$ | 1.5 | 1064 | no resistance reduction |

The above experimental results show that suitable combinations of the peak power density and the frequency enable the surface layer portion of the $BaTiO_3$-based ceramic single plate to have low resistance. Specifically, the low-resistance section can be formed when the peak power density of the pulse laser is $1\times10^6$ W/cm$^2$ to $1\times10^9$ W/cm$^2$ and the frequency is 500 kHz or less. If the frequency is too large even with a suitable peak power density, the once heated surface is irradiated with next pulse light before sufficiently cooled, and a crack may be generated due to heat accumulation. The irradiation with a peak power density below the foregoing range failed to form a low-resistance section or generated a crack. The irradiation with a high peak power density generated a crack or abrasion. It can be said that the effect of wavelength is not great. In particular, when the peak power density of the pulse laser is $1\times10^6$ W/cm$^2$ to $1\times10^8$ W/cm$^2$ and the frequency is 10 kHz to 100 kHz in the foregoing ranges, a low-resistance section with good plating deposition properties can be formed while generation of a fine crack is suppressed.

For comparison, the continuous wave laser-irradiation experiment was carried out at various average power densities by using the same BaTiO$_3$-based ceramic single plate as that used in the above experiment. Specifically, an Yb fiber laser was used, the scanning speed was 100 mm/s, and the pitch interval was 30 μm. The laser-irradiation range was a 5 mm×5 mm square region. The results are shown in Table 2.

TABLE 2

| Laser type | Yb Continuous wave laser | |
| --- | --- | --- |
| Wavelength | 1064 nm | |
| Scanning speed | 100 mm/s | |
| Pitch | 30 μm | |
| Average power density | $8.8 \times 10^5$ W/cm$^2$ | $6.6 \times 10^5$ W/cm$^2$ |
| Results | crack is generated | non-modified section is present |

As shown in the results in Table 2, a crack was generated in the irradiation with a continuous wave laser of $8.8\times10^5$ W/cm$^2$, and no low-resistance section was formed in the irradiation with a continuous wave laser of $6.6\times10^5$ W/cm$^2$.

Example 2

As illustrated in FIG. 1 and FIG. 2, only both end portions of the bottom surface of the ceramic base body 10 containing BaTiO$_3$ as a base material were irradiated with a pulse laser under the conditions described in Table 3. Electrolytic Ni plating was performed on the laser-irradiated ceramic base body 10 under the conditions described in Table 4, and Ni was continuously deposited on the laser-irradiated areas (low-resistance sections) and both end surfaces on which the inner electrodes were exposed. Ni plating is not deposited unless the degree of resistance reduction is particularly large. Under the conditions shown in Table 3, the low-resistance sections with low resistance values were formed, and suitable plated electrodes were thus formed.

TABLE 3

| Laser Irradiation Conditions in Example 2 | |
| --- | --- |
| Laser type | YVO$_4$ pulse laser |
| Wavelength | 1064 nm |
| Pulse width | 25 ns |
| Peak power density | 5 MW/cm$^2$ |
| Frequency | 20 kHz |
| Scanning speed | 100 mm/s |
| Pitch | 10 μm |

TABLE 4

| Electrolytic Ni Plating Conditions in Example 2 | |
| --- | --- |
| Plating bath | Watts bath |
| Plating method | barrel plating using mixture of media balls and works |
| Current | 20 A |
| Plating time | 60 min |

Example 3

As illustrated in FIG. 1 and FIG. 2, the ceramic base body 10 containing BaTiO$_3$ as a base material was irradiated with a YVO$_4$ solid-state SHG laser (wavelength: 532 nm) under the conditions shown in Table 5. An attenuator was used during irradiation. The peak power density is a value in consideration of light attenuation provided by the attenuator. The irradiation range is the same as in Example 2. Electrolytic Cu plating was performed on the laser-irradiated ceramic base body 10 under the conditions described in Table 6, and Cu plating was deposited on the laser-irradiated areas (low-resistance sections) and both end surfaces.

TABLE 5

| Laser Irradiation Conditions in Example 3 | |
| --- | --- |
| Laser type | YVO$_4$ pulse laser |
| Wavelength | 532 nm |
| Pulse width | 25 ns |
| Peak power density | 85 MW/cm$^2$ |
| Frequency | 100 kHz |
| Scanning speed | 100 mm/s |
| Pitch | 20 μm |

TABLE 6

| Electrolytic Cu Plating Conditions in Example 3 | |
| --- | --- |
| Plating bath | Cu pyrophosphate bath |
| Plating method | barrel plating using mixture of media balls and works |
| Current | 5 A |
| Plating time | 275 min |

The pulse-laser irradiation pitch may be smaller or larger than the laser-irradiation spot diameter. In other words, the adjacent low-resistance sections do not necessarily overlap each other and may be distant from each other at a predetermined distance. Even when the low-resistance sections are distant from each other, plating grows in a plane shape from the metal deposited on the low-resistance sections by electroplating such that the metal serves as a nucleus for plating growth, which enables formation of continuous electrodes.

Examples described above illustrate application of the present disclosure to formation of the outer electrodes of the multilayer ceramic capacitor of the present disclosure. The present disclosure is not limited to these Examples. The electronic components targeted for the present disclosure are not limited to multilayer ceramic capacitors, and the present disclosure can be applied to any ceramic electronic component formed of a titanium-based metal oxide in which semiconductor sections (low-resistance sections) may be formed by pulse-laser irradiation. In other words, the material of the ceramic base body is not limited to BaTiO$_3$.

To form low-resistance sections, one pulse laser may be split into laser beams, and the laser beams may be emitted toward plural positions simultaneously. Moreover, the laser may be out of focus, which may result in a larger laser-irradiation range than that with a laser in focus.

The present disclosure is not limited to the case where all the electrodes formed on the surface layer portion of the ceramic base body are composed of only plated electrodes. In other words, the present disclosure can also be applied to the case where the electrodes are formed of plural materials. For example, underlying electrodes may be formed on part of the surface of the ceramic base body by using, for example, a conductive paste, sputtering, and vapor deposition, and low-resistance sections may be formed in regions adjacent to the underlying electrodes, and plated electrodes may be continuously formed on the low-resistance sections and the underlying electrodes. In addition, the regions in which the low-resistance sections are formed can be freely selected.

What is claimed is:

1. A method for manufacturing a ceramic electronic component, the method comprising:
    preparing a ceramic base body containing a titanium-containing metal oxide;
    forming a low-resistance section by modifying the metal oxide through irradiation of part of a surface layer portion of the ceramic base body with a pulse laser; and
    forming an electrode on the low-resistance section by electroplating,
    wherein the irradiation with the pulse laser is performed with a peak power density of $1\times10^6$ W/cm$^2$ to $1\times10^9$ W/cm$^2$ and a frequency of 500 kHz or less.

2. The method for manufacturing a ceramic electronic component according to claim 1, wherein the metal oxide is formed into an n-type semiconductor in the low-resistance section.

3. The method for manufacturing a ceramic electronic component according to claim 1, wherein
    the irradiation with the pulse laser is performed with a peak power density of $1\times10^6$ W/cm$^2$ to $1\times10^8$ W/cm$^2$ and a frequency of 10 kHz to 100 kHz.

4. The method for manufacturing a ceramic electronic component according to claim 1, wherein the ceramic base body contains BaTiO$_3$.

5. The method for manufacturing a ceramic electronic component according to claim 1, wherein
    the ceramic electronic component is a multilayer ceramic capacitor;
    a plurality of end portions of inner electrodes is exposed on each of both end surfaces of the ceramic electronic component;
    the low-resistance section is formed in at least one side surface adjacent to the both end surfaces of the ceramic electronic component in such a manner that the low-resistance section is formed in each of portions of the side surface that adjoin the respective end surfaces; and
    the electrode is continuously formed on each end surface and each low-resistance section of the ceramic electronic component.

6. The method for manufacturing a ceramic electronic component according to claim 2, wherein
    the irradiation with the pulse laser is performed with a peak power density of $1\times10^6$ W/cm$^2$ to $1\times10^8$ W/cm$^2$ and a frequency of 10 kHz to 100 kHz.

7. The method for manufacturing a ceramic electronic component according to claim 2, wherein the ceramic base body contains BaTiO$_3$.

8. The method for manufacturing a ceramic electronic component according to claim 3, wherein the ceramic base body contains BaTiO$_3$.

9. The method for manufacturing a ceramic electronic component according to claim 6, wherein the ceramic base body contains BaTiO$_3$.

10. The method for manufacturing a ceramic electronic component according to claim 2, wherein
    the ceramic electronic component is a multilayer ceramic capacitor;
    a plurality of end portions of inner electrodes is exposed on each of both end surfaces of the ceramic electronic component;
    the low-resistance section is formed in at least one side surface adjacent to the both end surfaces of the ceramic electronic component in such a manner that the low-resistance section is formed in each of portions of the side surface that adjoin the respective end surfaces; and
    the electrode is continuously formed on each end surface and each low-resistance section of the ceramic electronic component.

11. The method for manufacturing a ceramic electronic component according to claim 3, wherein
    the ceramic electronic component is a multilayer ceramic capacitor;
    a plurality of end portions of inner electrodes is exposed on each of both end surfaces of the ceramic electronic component;
    the low-resistance section is formed in at least one side surface adjacent to the both end surfaces of the ceramic electronic component in such a manner that the low-resistance section is formed in each of portions of the side surface that adjoin the respective end surfaces; and
    the electrode is continuously formed on each end surface and each low-resistance section of the ceramic electronic component.

12. The method for manufacturing a ceramic electronic component according to claim 4, wherein
    the ceramic electronic component is a multilayer ceramic capacitor;
    a plurality of end portions of inner electrodes is exposed on each of both end surfaces of the ceramic electronic component;
    the low-resistance section is formed in at least one side surface adjacent to the both end surfaces of the ceramic electronic component in such a manner that the low-resistance section is formed in each of portions of the side surface that adjoin the respective end surfaces; and
    the electrode is continuously formed on each end surface and each low-resistance section of the ceramic electronic component.

13. The method for manufacturing a ceramic electronic component according to claim 6, wherein
    the ceramic electronic component is a multilayer ceramic capacitor;
    a plurality of end portions of inner electrodes is exposed on each of both end surfaces of the ceramic electronic component;
    the low-resistance section is formed in at least one side surface adjacent to the both end surfaces of the ceramic electronic component in such a manner that the low-resistance section is formed in each of portions of the side surface that adjoin the respective end surfaces; and
    the electrode is continuously formed on each end surface and each low-resistance section of the ceramic electronic component.

14. The method for manufacturing a ceramic electronic component according to claim 7, wherein
the ceramic electronic component is a multilayer ceramic capacitor;
a plurality of end portions of inner electrodes is exposed on each of both end surfaces of the ceramic electronic component;
the low-resistance section is formed in at least one side surface adjacent to the both end surfaces of the ceramic electronic component in such a manner that the low-resistance section is formed in each of portions of the side surface that adjoin the respective end surfaces; and
the electrode is continuously formed on each end surface and each low-resistance section of the ceramic electronic component.

15. The method for manufacturing a ceramic electronic component according to claim 8, wherein
the ceramic electronic component is a multilayer ceramic capacitor;
a plurality of end portions of inner electrodes is exposed on each of both end surfaces of the ceramic electronic component;
the low-resistance section is formed in at least one side surface adjacent to the both end surfaces of the ceramic electronic component in such a manner that the low-resistance section is formed in each of portions of the side surface that adjoin the respective end surfaces; and
the electrode is continuously formed on each end surface and each low-resistance section of the ceramic electronic component.

16. The method for manufacturing a ceramic electronic component according to claim 9, wherein
the ceramic electronic component is a multilayer ceramic capacitor;
a plurality of end portions of inner electrodes is exposed on each of both end surfaces of the ceramic electronic component;
the low-resistance section is formed in at least one side surface adjacent to the both end surfaces of the ceramic electronic component in such a manner that the low-resistance section is formed in each of portions of the side surface that adjoin the respective end surfaces; and
the electrode is continuously formed on each end surface and each low-resistance section of the ceramic electronic component.

17. A ceramic electronic component comprising:
a ceramic base body containing a titanium-containing metal oxide;
a low-resistance section formed in part of a surface layer portion of the ceramic base body and obtained by modifying the metal oxide; and
an electrode formed on the low-resistance section and made of a plating metal,
wherein the metal oxide is formed into an n-type semiconductor in the low-resistance section.

18. The ceramic electronic component according to claim 17, wherein the ceramic base body contains $BaTiO_3$.

19. The ceramic electronic component according to according to claim 17, wherein
the ceramic electronic component is a multilayer ceramic capacitor;
a plurality of end portions of inner electrodes is exposed on each of both end surfaces of the ceramic electronic component;
the low-resistance section is formed in at least one side surface adjacent to the both end surfaces of the ceramic electronic component in such a manner that the low-resistance section is formed in each of portions of the side surface that adjoin the respective end surfaces; and
the electrode made of a plating metal is continuously formed on each end surface and each low-resistance section of the ceramic electronic component.

20. The ceramic electronic component according to according to claim 18, wherein
the ceramic electronic component is a multilayer ceramic capacitor;
a plurality of end portions of inner electrodes is exposed on each of both end surfaces of the ceramic electronic component;
the low-resistance section is formed in at least one side surface adjacent to the both end surfaces of the ceramic electronic component in such a manner that the low-resistance section is formed in each of portions of the side surface that adjoin the respective end surfaces; and
the electrode made of a plating metal is continuously formed on each end surface and each low-resistance section of the ceramic electronic component.

* * * * *